United States Patent
Dorrance et al.

(10) Patent No.: US 7,336,350 B2
(45) Date of Patent: Feb. 26, 2008

(54) WHEEL ALIGNMENT APPARATUS AND METHOD UTILIZING THREE-DIMENSIONAL IMAGING

(75) Inventors: Daniel R. Dorrance, Ballwin, MO (US); Nicholas J. Colarelli, III, St. Louis, MO (US); Timothy A. Strege, Ballwin, MO (US); Thomas J. Golab, St. Peters, MO (US); David A. Voeller, St. Louis, MO (US); Mark S. Shylanski, St. Louis, MO (US); Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 400 days.

(21) Appl. No.: 10/958,872

(22) Filed: Oct. 5, 2004

(65) Prior Publication Data

US 2005/0068522 A1 Mar. 31, 2005

Related U.S. Application Data

(63) Continuation-in-part of application No. 10/439,153, filed on May 15, 2003, now Pat. No. 6,894,771.

(60) Provisional application No. 60/378,123, filed on May 15, 2002.

(51) Int. Cl.
*G01B 11/26* (2006.01)

(52) U.S. Cl. .......................... 356/139.09; 356/139.01; 356/139.1

(58) Field of Classification Search ............ 356/139.09
See application file for complete search history.

(56) References Cited

U.S. PATENT DOCUMENTS

| | | | |
|---|---|---|---|
| 6,400,451 B1 * | 6/2002 | Fukuda et al. | 356/139.09 |
| 6,412,183 B1 * | 7/2002 | Uno | 33/203.12 |
| 6,690,456 B2 | 2/2004 | Bux et al. | |
| 6,691,062 B1 | 2/2004 | Nobis | |
| 6,710,866 B1 | 3/2004 | Adolph | |
| 6,731,382 B2 | 5/2004 | Jackson et al. | |
| 6,762,427 B1 | 7/2004 | Kong et al. | |
| 6,894,771 B1 * | 5/2005 | Dorrance et al. | 356/139.09 |

FOREIGN PATENT DOCUMENTS

DE 4212426 1/1993

* cited by examiner

*Primary Examiner*—Thomas H. Tarcza
*Assistant Examiner*—Luke D. Ratcliffe
(74) *Attorney, Agent, or Firm*—Polster, Lieder, Woodruff & Lucchesi, L.C.

(57) ABSTRACT

A vehicle wheel alignment system utilizing a non-contact range finding system in conjunction with one or more optical imaging sensors to acquire images of a fixed target, fixed random object, or the vehicle wheels, from which three-dimensional information related to one or more optical imaging sensor positions or vehicle wheel alignment angles can be obtained.

14 Claims, 7 Drawing Sheets

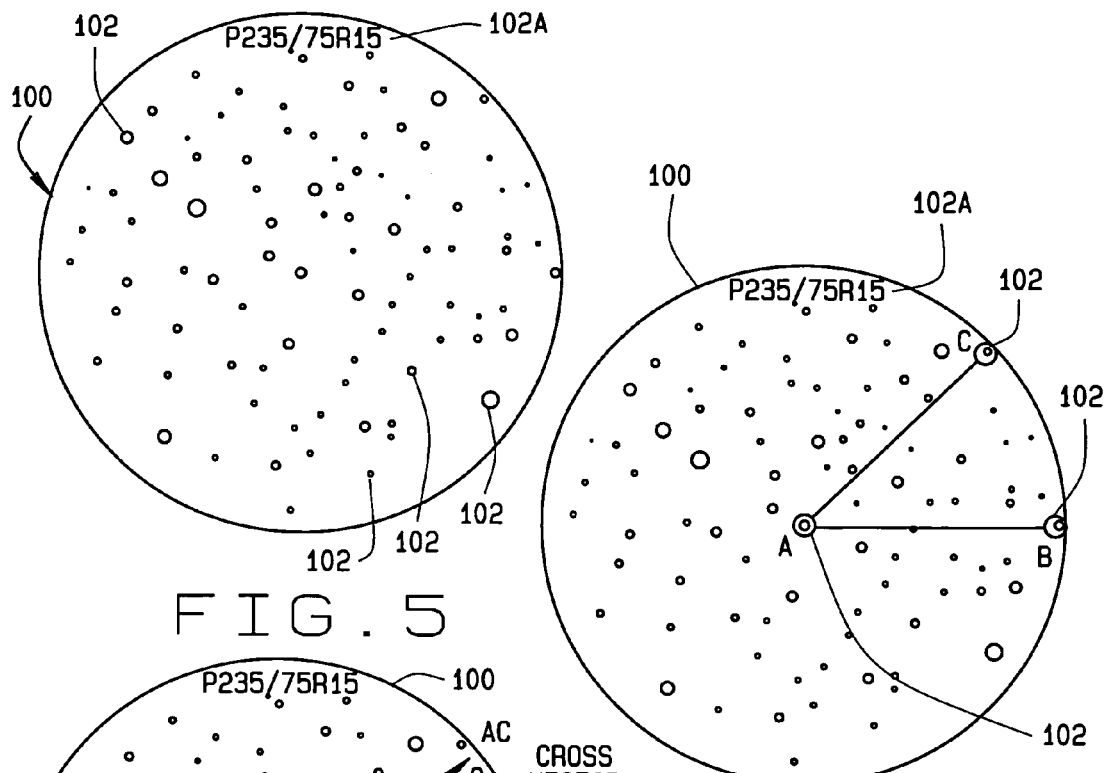
FIG. 5
FIG. 6
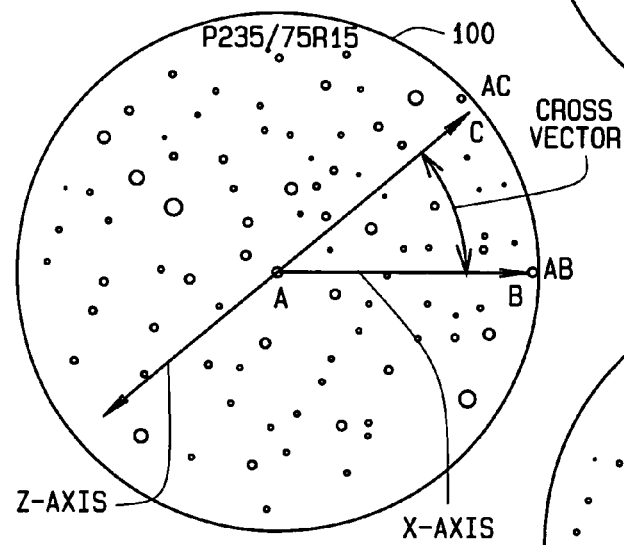
FIG. 7
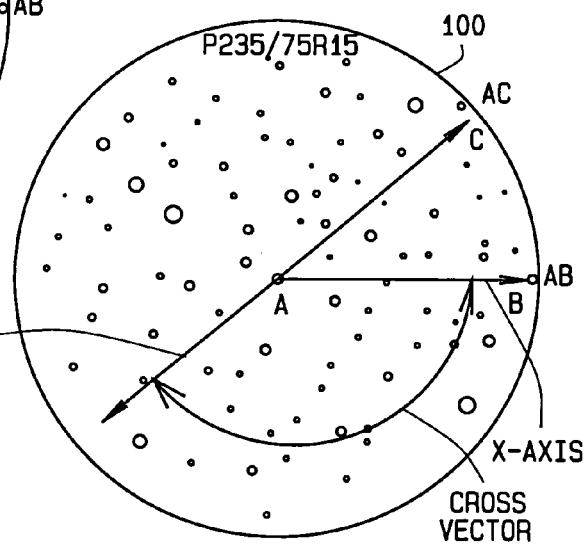
FIG. 8

WHEEL ALIGNMENT APPARATUS AND METHOD UTILIZING THREE-DIMENSIONAL IMAGING

CROSS-REFERENCE TO RELATED APPLICATIONS

The present application is a continuation-in-part of, and claims priority from, U.S. patent application Ser. No. 10/439,153 now U.S. Pat. No. 6,894,771 filed on May 15, 2003 which in turn, claims priority from U.S. Provisional Patent Application No. 60/378,123 filed on May 15, 2002, both of which are herein incorporated by reference.

STATEMENT REGARDING FEDERALLY SPONSORED RESEARCH

Not Applicable.

BACKGROUND OF THE INVENTION

The present invention relates to vehicle wheel alignment systems, and in particular to an improved non-contact vehicle wheel alignment system utilizing one or more range finding systems in conjunction with optical imaging sensors to acquire images of a common reference point or vehicle from which three-dimensional information identifying one or more optical imaging sensor positions or vehicle wheel alignment angles can be obtained.

Various systems have been designed to determine vehicle wheel alignment angles. Originally, vehicle wheel alignment angles were measured directly by alignment angle sensors mounted to the vehicle wheels. For example, U.S. Reissue Pat. No. 33,144 to Hunter et al. and U.S. Pat. No. 4,319,838 to Grosssman et al. each describe vehicle wheel alignment systems which use electro-optical transducers to determine the toe alignment angles of a vehicle. In these systems, six or more electro-optical transducers are carried by support assemblies which are mounted to the vehicle wheels, two on each front wheel, and one on each rear wheel. The '144 Hunter et al. patent and the '838 Grossman et al. patent further describe and illustrate the various wheel alignment angles which can be directly measured using the electro-optical transducers, and how to compute additional angles from these directly measured angles.

In addition to the electro-optical transducers used to measure wheel angles, a gravity-referenced inclinometer, such as shown in U.S. Pat. No. 4,879,670 to Colarelli may also be used. Gravity-referenced inclinometers can be mounted to the vehicle wheels to provide measurements of the wheel camber angle, assuming that the vehicle, while being measured, is resting on a flat and level surface. SAE Publication No. 850219, entitled "Steering Geometry and Caster Measurement" by January, derives and discusses the industry standard procedures and methods by which toe and camber wheel alignment angle transducers are used to determine the caster and steering axis inclination (SAI) angles of the vehicle.

Equipment of this general type, and the use of the apparatus and method set forth above, is well known in the vehicle wheel alignment industry. Such equipment is capable of determining the camber, caster, and toe alignment angles of the wheels of a vehicle relative to one or more appropriate reference axes, and is sufficient to permit proper adjustment of the vehicle wheel alignment so as to reduce tire wear and provide for safe vehicle handling.

An alternative type of vehicle wheel alignment system which has become increasingly popular is what is commonly referred to as an "external reference aligner". U.S. Pat. Nos. 4,745,469 and 4,899,218, both to Waldecker et al., illustrate how lasers may be used to illuminate the tires of a vehicle with structured light, and cameras used to capture images of the illuminated tires. These patents further describe how "machine vision techniques" are employed to process the obtained images and to determine distances between the cameras and locations on the tire sidewalls, thereby allowing a determination of the locations and orientations of the vehicle wheels in a coordinate system relative to the cameras. Subsequent processing of the determined locations and orientations identifies conventional wheel alignment angles such as toe, camber, and caster for the imaged vehicle wheels.

German Patent No. DE 29 48 573 A1, assigned to Siemens AG, describes the use of cameras to determine the locations and orientations of the wheels of a vehicle. On one side of the vehicle, a single camera is moved to multiple positions to view the vehicle wheels and obtain multiple images of the known ellipse formed by the wheel rim. Alternatively, a single fixed camera is used at each side of the vehicle in conjunction with movable mirrors, or multiple cameras may be used to obtain the multiple images. The system examines the sets of images of the rim ellipses thus viewed for each of the wheels of the vehicle, identifies major and minor ellipse axes, and subsequently determines the locations and orientations of the wheels. Using this determined information, the conventional wheel alignment parameters are identified.

Continued development in the industry of "external reference aligners" is shown in a series of patents related to U.S. Pat. No. 5,675,515 to January, and in a series of patents related to U.S. Pat. No. 5,535,522 to Jackson. These patents describe and disclose various embodiments of "external reference aligners" and vehicle wheel alignment systems in which optical targets of known configurations having contrasting surfaces are mounted to the wheels of a vehicle undergoing alignment. Images of the known optical targets are obtained by one or more camera systems, and processed to determined relative positions, orientations, and rotational axes in three-dimensional space. From the relative positions, orientations, and rotational axes of the targets, corresponding information about the associated vehicle wheels is calculated, and conventional wheel alignment angles identified.

The optical targets of known configurations employed in conventional "external reference aligner" systems typically consist of high contrast geometric shapes such as circles, squares, or triangles. The accuracy of such an optical target is dependent upon how well the high contrast edge of the geometric shapes can be located in the pixellated image produced by the machine vision camera system observing the target. For the best accuracy, the high contrast geometric shapes must be separated from each other on the face of the target by a distance which is sufficient to prevent the apparent fusing of adjacent shapes into a single shape when reduced edge sharpness causes two shapes to bleed into the same image pixel. These factors combine to limit the number of pixels in an image whose values are utilized to calculate the position and orientation of the optical target to a very small portion of the pixels in the image which represent the target. Typically, only a small percentage of the pixels in the image of a target are used to calculate the position and orientation of a high-contrast optical target.

Accordingly, an increase in performance and functionality of external reference vehicle wheel alignment systems would be greatly beneficial. One possibility for increasing performance and functionality would be to provide a target design which provides a high percentage of useful image pixels for purposes of determining target position and orientation. An alternative improvement would be the elimination of the need for costly known optical targets in a system which is capable of determining the position, orientation, and rotational axes of one or more vehicle wheels directly from images obtained by one or more imaging systems configured to observe and track multiple points on a vehicle wheel without the need for highly precise attached optical targets.

BRIEF SUMMARY OF THE INVENTION

Briefly stated, a wheel alignment apparatus of the present invention determines the alignment of the wheels of a vehicle. The apparatus includes at least a first camera disposed to receive images of the one or more wheels on one side of the vehicle and at least a second camera disposed to receive images of the one or more wheels on the opposite side of the vehicle. A computer or processing system is operatively connected to the cameras, and is responsive to the images generated thereby to determine values of wheel alignment parameters of the vehicle. In a first embodiment of the present invention, a range finding system is utilized in conjunction with the cameras. The range finding system is disposed in a known relationship to the cameras, and is configured to provide an accurate estimate of a distance from the cameras to the vehicle wheels. Using the estimate of distance, and the images acquired by the cameras, the computer or processing system is configured to utilize the three-dimensional positions of a plurality of random features visible on the surfaces of the vehicle wheel and tire assemblies to determine vehicle wheel alignment angles.

In a first alternate embodiment of the present invention, the range finding system associated with the wheel alignment apparatus is configured with optical imaging elements which are capable of providing range-to-target or time-of-flight information for each pixel in an image. The computer or processing system is configured to utilize the range-to-target or time-of-flight information received for pixels representing surfaces of the vehicle wheel and tire assemblies to establish an initial estimate of distances in three dimensional space, together with higher resolution images of the vehicle wheels received from the imaging cameras to determine vehicle wheel alignment angles.

In a second alternate embodiment of the present invention, a method is provided for estimating a distance between an imaging component in a vehicle wheel alignment system and a vehicle wheel. An initial image of the vehicle wheel is obtained by the imaging component, and is processed to identify portions of one or more image features corresponding to known elements of the vehicle wheel. The identified portions of each image feature are evaluated using the known dimensions of the corresponding known elements to determine an estimated distance between the imaging component and the wheel surface on which the known elements are disposed.

In a third alternate embodiment of the machine vision wheel alignment system of the present invention, a fixed object or target is utilized in conjunction with a moveable set of cameras. The fixed object or target is disposed in a fixed relationship to an initial known position of the movable cameras. Using images acquired by the movable cameras before and after movement, the computer or processing system is configured to utilize the three-dimensional position of the fixed object or target point relative to the movable camera to calculate a coordinate system transformation between the known position of the movable cameras prior to movement, and the resulting position of the movable cameras subsequent to movement.

In a fourth alternate embodiment of the present invention, a vehicle wheel alignment apparatus is provided for determining the alignment of at least one wheel of a vehicle. The wheel alignment apparatus includes an optical imaging system configured to obtain images associated with the wheels of a vehicle and portions of a vehicle body adjacent the wheels. A processing system is configured to process each of the images to identify random local features disposed on a surface of the vehicle body and to utilize the identified local features to track vehicle body movement between sequential images.

A fifth alternate embodiment of the present invention sets forth a machine-vision vehicle wheel alignment apparatus for determining the alignment of at least one wheel of a vehicle disposed on a vehicle support surface. The system includes a set of optical targets secured in a fixed relationship to the vehicle support surface and an optical imaging system configured to obtain at least one image associated with each wheel of the vehicle as well as at least one image of each optical target. The system includes a processing system configured to process each of said images to identify the optical targets and random local features disposed on a surface of each wheel of the vehicle. The processing system is configured to utilize the identified optical targets to identify a reference surface on which the vehicle is disposed, and to utilizes the identified random local features on each vehicle wheel to determine one or more vehicle wheel alignment angles.

A sixth alternate embodiment of the present invention sets forth a machine-vision vehicle wheel alignment apparatus for determining the alignment of at least one wheel of a vehicle which incorporates a structured light projection means to facilitate initial distance estimations between imaging sensors and local features identified on the vehicle wheel surfaces. The system includes a processor configured to utilize the initial distance estimations and images of the local features to determine associated vehicle wheel alignment angles.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is a representation of the wheel portion of an image, illustrating a plurality of random local features;

FIG. 6 illustrates the selection of a set of local features in the image of FIG. 5;

FIG. 7 illustrates the use of the set of local features shown in FIG. 6 to establish a wheel X-axis and a wheel Z-axis;

FIG. 8 illustrates the use of the set of local features shown in FIG. 6 and the established Z-axis to establish a wheel Y-axis;

Corresponding reference numerals indicate corresponding parts throughout the several Figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
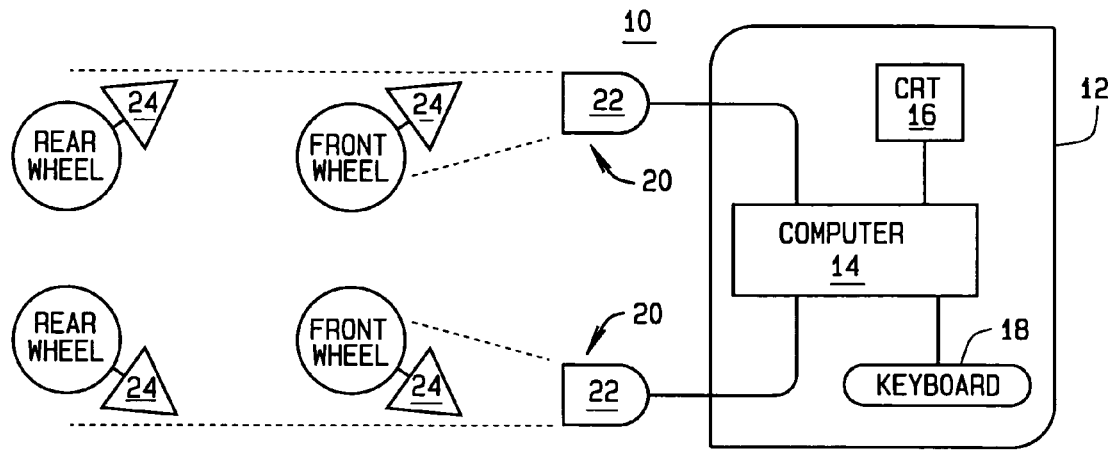
FIG. 1 is a block diagram of a prior art wheel alignment imaging system.

It is preferred that the present invention be embodied as an improvement to a computer controlled optical imaging vehicle wheel alignment system, shown generally in FIG. 1 at 10, such as is set forth and described in U.S. Pat. No. 5,675,515 to January, and U.S. Pat. No. 6,298,284 B1 to Burns, Jr. et al., each herein incorporated by reference. The optical imaging vehicle wheel alignment system 10 consists generally of a console 12 having a computer 14, such as a microprocessor, logic circuit, or processing system of sufficient capacity to enable the functionality of the system 10, one or more display devices 16, such as a monitor, and one or more input devices 18, such as a keyboard. The computer or microprocessor 14 is configured with one or more software applications, at least one of which is adapted to facilitate the alignment of vehicle wheels, which consist of a rim and an associated tire, using input received from one or more sensors, imaging means, or imaging components 20. In an optical imaging vehicle wheel alignment system 10, the sensors, imaging means, or imaging components 20 are part of a camera system or imaging system 22 configured to view one or more optical targets 24 within a field of view to obtain images thereof for processing by the software application, and may include any of a variety of conventional imaging elements, such as, but not limited to, CCD sensors or CMOS sensors.

Figure 2:
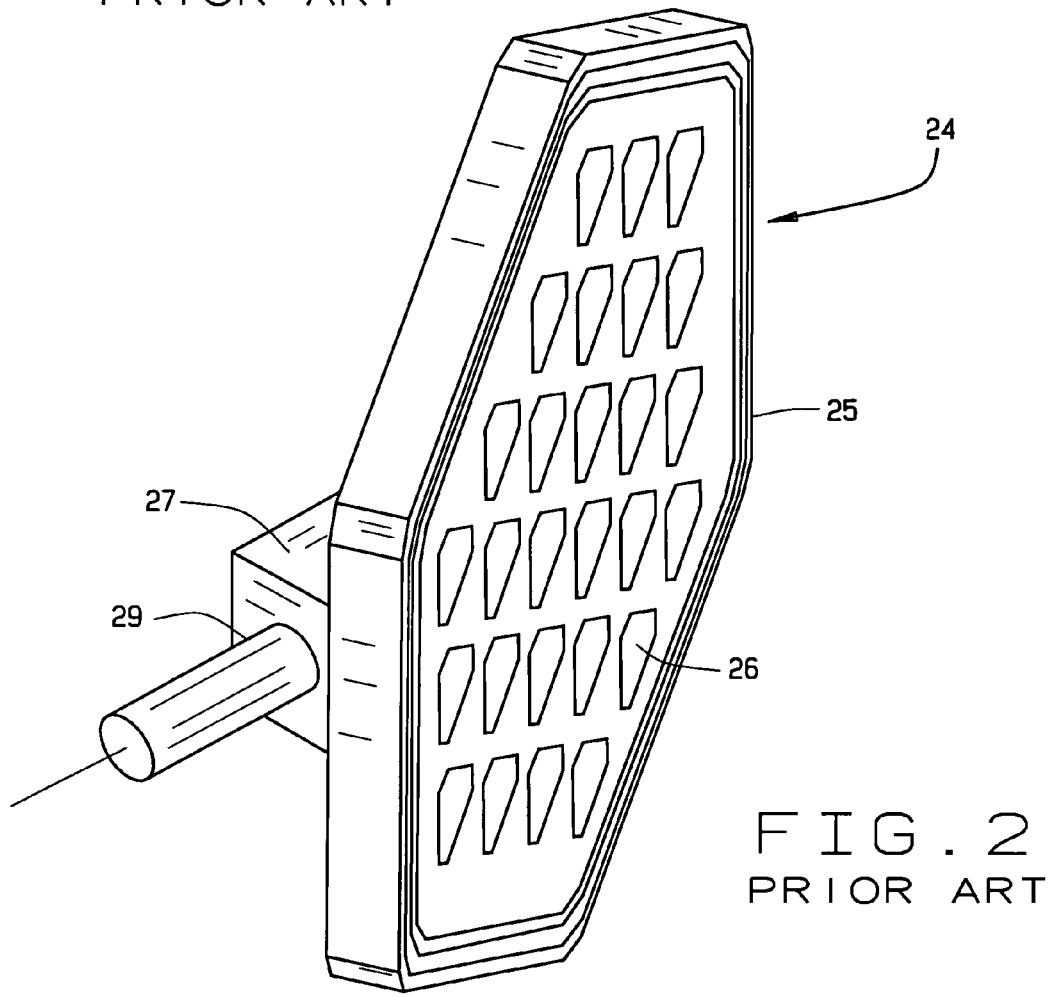
FIG. 2 is a representation of a prior art optical target utilizing high-contrast black and white optical elements.

A conventional configuration of a predetermined optical target 24 is shown in FIG. 2, and is described in U.S. Pat. No. 6,064,750 to January, and U.S. Pat. No. 6,134,792 to January, each herein incorporated by reference. Each optical target 24 consists of a target face 25, on which are disposed optical elements 26, a base 27, and a mounting shaft 29. An exemplary computer controlled optical imaging vehicle wheel alignment system 10 is the Series 611 Wheel Alignment System utilizing the DSP 400 Series sensors, manufactured and sold by Hunter Engineering Company of Bridgeton, Mo.

As shown in FIG. 2, the conventional configuration for an optical target 24 employed with an optical imaging vehicle wheel alignment systems 10 is precisely engineered with high-contrast geometric shapes as optical target elements 26 such as circles, squares, or triangles. The accuracy of such conventionally configured optical targets 24 is dependant upon how well the high contrast edges of the optical target elements 26 can be located in a pixellated image produced by the imaging system 22 of the optical imaging vehicle wheel alignment system 10. For the best accuracy, the individual optical elements 26 must be large enough to have relatively long straight or curved boundaries, and they must be separated far enough to prevent the individual optical target elements 26 from appearing to fuse into a single object when reduced edge sharpness causes two or more optical target elements 26 to bleed into the same pixel in the imaging system 22. These factors combine to limit the number of individual image pixels generated by the imaging system 22 whose values are utilized to calculate a position and orientation of a conventionally configured optical target 24.

Each image of conventional high-contrast optical targets 24 acquired by the optical imaging vehicle wheel alignment system 10 are processed to identify a number of reference points in the image. Either the computer 14 or the imaging system 22 itself is configured to mathematically manipulate the positional relationships of the observed reference points, as identified in an image, to match them with a set of predetermined positional relationships based on the known parameters of the conventional high-contrast optical target 24. Once the relationship between the observed positional relationships and the predetermined positional relationships is identified for the reference points, the position and orientation in three-dimensional space of the target (and an associated vehicle wheel) relative to the position and orientation of the imaging system is identified, from which one or more vehicle wheel alignment angles can be identified. Accordingly, for an optical imaging vehicle wheel alignment system 10 to function, it is necessary for the system 10 to be capable of extracting a set of control or reference points from acquired images.

In a preferred embodiment of the present invention, the requirement for attaching high-contrast and predetermined optical targets 24 to the vehicle wheels 100 is eliminated. Rather than acquire images of predetermined optical targets 24, the imaging system 22 is configured to acquire one or more images of at least a portion of each of the vehicle wheels 100, and to identify a plurality of random local features 102 disposed on the vehicle wheel 100, in each image, from which sufficient reference point information can be determined to identify one or more wheel alignment angles.

The random local features 102 identified in each image correspond to features arrayed on the surface of the wheel 100, either on the wheel rim itself, or on those portions of the tire which are not distorted due to the weight of the vehicle. When a sequence of images are acquired by the imaging system 22 for the vehicle wheel 100 in a series of rotational positions, the wheel 100 is modeled as a solid object rotating about a single axis between the images. A minimum number of random local features 102 which can be identified in the series of images of the vehicle wheel 100 at different rotational positions are selected by the imaging system 22. From these easily identifiable local features 102, the motion of the vehicle wheel 100 between each of the images is determined by matching the local feature position changes in the series of images with those predicted for rotation of the vehicle wheel 100. Once the vehicle wheel 100 rotation is known, spatial relationships between the easily identifiable random local features 102 and other two-dimensional random local features can be used to determine correct correspondence between two dimensional random local features 102 in multiple images, and thereby provide control points for alignment computation.

Figure 3:
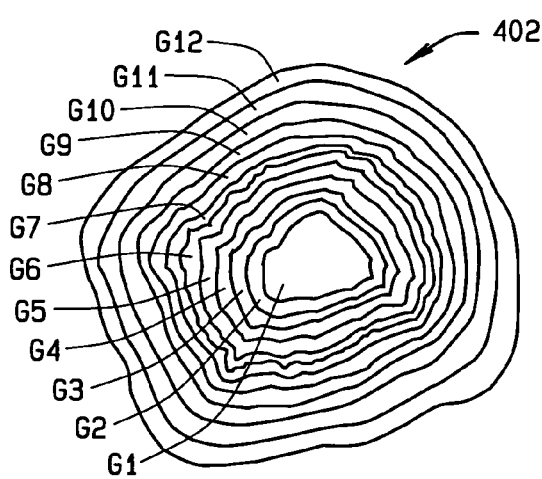
FIG. 3 is a gradient representation of a random local feature in an image.
Figure 4:
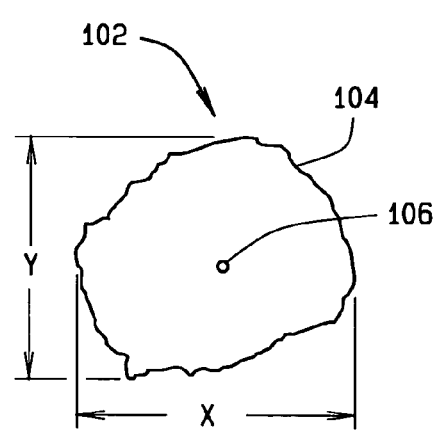
FIG. 4 is a representation of the characteristics of the random local feature shown in FIG. 3 at a selected gradient threshold.

Preferably, a suitable random local feature 102 is anything present in an image of at least a portion of a vehicle wheel 100 having a closed border 104 consisting of more than one image pixel. The closed border 104 is normally defined by a brightness gradient limit (threshold) or a gray-scale line gradient magnitude limit which is selected based on the parameters of the imaging system components. As shown in FIGS. 3 and 4, if an exemplary random local feature 102 identified in an image consists of a gray-scale gradient from dark to light represented by the numbers G1 through G12, and the gradient limit (threshold) is set at between G6 and G7 then the closed border 104 for the exemplary random local feature 102 would be defined as shown in FIG. 4.

Once the closed border 104 for a particular random local feature 102 is established, various statistics can be used to uniquely identify the random local feature 102 as the vehicle wheel 100 is rotated about an axis from a first position to a subsequent position. For example, as shown in FIG. 4, a width "W", a height "H" and centroid 106 of the random local feature 102 may be computed using standard image processing techniques.

As shown in FIG. 5, once an image of a vehicle wheel 100 is obtained by an imaging means or component 20, and preliminarily processed by the imaging system to identify the portion of the image which is representative of the face of the vehicle wheel 100, a multitude of random local features 102 may be identified within the boundaries of the vehicle wheel 100. These random local features 102 can consist of any identifiable element found on any portion of the vehicle wheel 100, such as the rim or the tire. Preferably, the random local features 102 are selected from features which are unlikely to change during the vehicle wheel alignment procedure, such as the common lettering 102A found on a tire, scuff marks, scratches, wheel lug nuts, tire tread lugs wheel rim elements, or a splattering of dried mud. Alternatively, the random local features 102 could be selected from a set of local features temporarily applied to the vehicle wheel, such as a plurality of stick-on local features, or spots of sprayed-on liquids. An ideal spray-on liquid is one which dries quickly, is not easily removed without washing, and that can be seen only when a black or ultraviolet light is used to illuminate the wheel 100. A company that specializes in making products that are illuminated under ultraviolet light (black light) is Beaver Luminescers of Newton, Mass.

Figure 9:
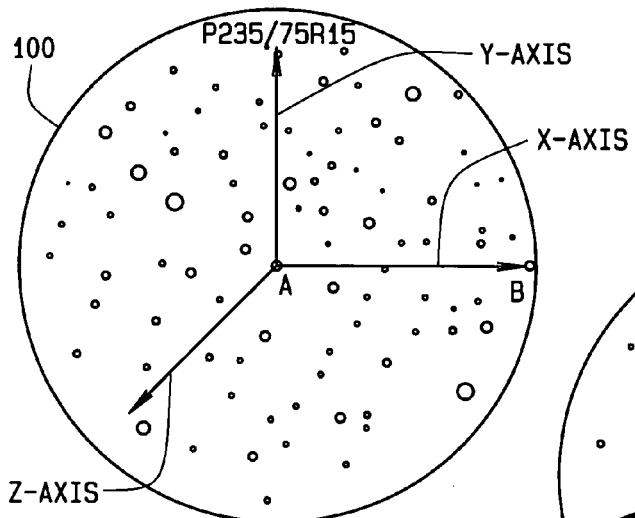
FIG. 9 illustrates the established X, Y, and Z-axes for the wheel of FIG. 5.

A preferred method for processing an image and the random local features 102 present therein to obtain information from which vehicle wheel alignment angles can be determined is shown in FIG. 6 in which two random vectors AB and AC are created from three arbitrary local features 102 selected in the image, identified as A, B, and C. Preferably, at least one of the local features 102 identified as A, B, and C is selected to lie near the center of the image of the vehicle wheel 100. The vector AB is utilized to define an X-axis. A cross vector is calculated between vector AB and vector AC to establish a Z-axis, as shown in FIG. 7. A second cross vector is calculated between the vector AB and the established Z-axis, as shown in FIG. 8, to establish the Y-axis. The resulting X-Y-Z axes in a wheel-based Cartesian coordinate system are shown in FIG. 9.

Figure 10:
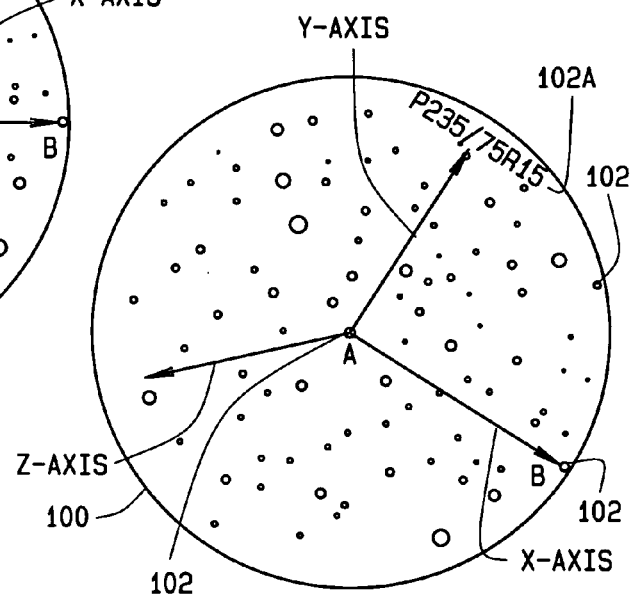
FIG. 10 illustrates the effect of rotation of the wheel on the established axes of FIG. 9.

Once the X-Y-Z axis wheel-based Cartesian coordinate system, i.e., a target coordinate system, has been established, the locations for a selected set of identified random local features 102 present in the image are fixed within the established Cartesian coordinate system. If the vehicle wheel 100 changes in yaw, pitch, and/or roll, the locations for these identified random local features 102 will not change within the established wheel-based Cartesian coordinate system, as illustrated in FIG. 10. In essence, once identified, the set of selected random local features 102 on the surface of the vehicle wheel 100 function in the same manner as the optical elements of a predetermined optical target, providing a plurality of discrete reference or control points which can be computationally modeled by the imaging system 22 to identify parameters related to vehicle wheel alignment angles.

During operation, each imaging means 20 preferably resolves a minimum number of random local features 102 located on the surface of associated vehicle wheels 100. An image of each vehicle wheel 100 at a first position is matched to a second image of the same vehicle wheel 100 moved to a subsequent placement, which may have either a different position, a different orientation, or both. A minimum number of images, preferably two, are used to establish which random local features 102 contained in the images can be used to establish reference or control points for purposes of determining the position of the vehicle wheel 100, i.e. the Axis Of Rotation—AOR of the vehicle wheel 100. The AOR is calculated using known facts about each selected local feature 102, such as the centroid, height, width, area, etc., in combination with known pattern recognition techniques.

Conventional non-contact optical vehicle wheel alignment systems 10, such as those described in the referenced U.S. Patents to January, determine an AOR of a vehicle wheel 100 using statistical methods (non-linear optimization) with a predetermined target made up of a predefined number of accurately determined elements and two rotation positions. In contrast to the conventional targets, the present invention is preferably configured to utilize a number of random unknown local features 102 (that are part of the vehicle wheel 100, or are temporarily marked on the vehicle wheel 100) and images of the wheel 100 moved between two or more rotational positions to determine the AOR for each imaged vehicle wheel 100. While there may be a greater error in the measurement of random local features 102 in each image, as compared to predetermined targets, given that the error is randomly distributed the AOR for the vehicle wheel 100 can be accurately determined.

There are two primary assumptions that permit resolution of initially undetermined reference or control points in a non-target based optical wheel alignment system. First, the random local features 102 (once identified on a vehicle wheel 100) do not change position relative to each other in the wheel-based Cartesian coordinate system for each rotational position of the vehicle wheel 100, and second, the AOR remains the same between each rotation position of the vehicle wheel 100.

The following table details some of the mathematical relationships that are used in computing the AOR for a vehicle wheel 100 from an image including a number of identified random local features 102. The relationships set forth in the table describe the mapping between reference points associated with the identified random local features 102 on the vehicle wheel 100, and where they are projected to on a plane in the viewing imaging component 20.

nate System u, v. The imaging component model includes parameters which are determined during a factory calibration process for each imaging component 20. These include the lens focal length and other known lens parameters.

Reference Points in Image Coordinates: This is the list of reference points in the Image Coordinate System coordinates u, v which is the two dimensional location on the imaging element of the imaging component 20 after each local feature in three dimensional space has been mapped through the imaging component model. These reference points are measured in the image and are known when determining the axis of rotation.

Axis of Rotation (AOR): The vehicle wheel AOR a, b, c is determined using the Wheel Transforms between each of

| Position of wheel | Reference Points in Wheel Coordinates | Wheel Transform | Reference Points in Imaging Component Coordinates | Fl, focal length Cx, lens X center Cy, lens Y center Imaging Component model | Reference Points in Image Coordinates |
|---|---|---|---|---|---|
| Position 1 | [x, y, z] | $[Tx, Ty, Tz, Rx, Ry, Rz]^1$ | $[i, j, k]^1$ | [Fl, Cx, Cy . . .] | $[u, v]^1$ |
| Position 2 | [x, y, z] | AOR[a, b, c] $[Tx, Ty, Tz, Rx, Ry, Rz]^2$ | $[i, j, k]^2$ | [Fl, Cx, Cy . . .] | $[u, v]^2$ |
| Position 3 | [x, y, z] | AOR[a, b, c] $[Tx, Ty, Tz, Rx, Ry, Rz]^3$ | $[i, j, k]^3$ | [Fl, Cx, Cy . . .] | $[u, v]^3$ |

The following are definitions of the terms in the above table:

Reference Points In Wheel Coordinates: This is a list of reference points derived from characteristics of the identified random local features 102 in the wheel coordinate system which corresponds to the wheel-based Cartesian coordinate X, Y, Z axes. The wheel coordinate system is determined by a method of cross products (previously described) from identified random local features 102 found in the image. Each identified random local feature 102 coordinate x, y, z is initially unknown and determined via statistical methods, however, once established, the identified random local feature 102 coordinates x, y, z remain the same for all positions of the vehicle wheel 100.

Wheel Transform: The list of reference points in wheel coordinates is converted using the Wheel Transform to a coordinate system i, j, k of the imaging component 20 which acquired the image. The Wheel Transform [Tx, Ty, Tz, Rx, Ry, Rz] has three translation parameters Tx, Ty, Tz and three rotation parameters Rx, Ry, Rz (commonly referred to as pitch, yaw, and roll). The Wheel Transform is different for each position and orientation of the vehicle wheel 100 and is initially unknown and determined via statistical methods.

Reference Points in Imaging Component Coordinates: This is the list of reference points in imaging component 20 coordinates i, j, k where i is horizontal to image plane, j is vertical to image plane and k is perpendicular to image plane out the front of the imaging component 20. This is an intermediate result used to illustrate how the reference points are converted from target coordinate system coordinates to the imaging component coordinate system coordinates.

Imaging Component Model: The imaging component model converts the list of reference points from the Imaging Component Coordinate System i, j, k to an Image Coordithe observed positions of the vehicle wheel 100. A primary assumption is that the AOR will be the same between all the observed positions.

The preferred method employed by the present invention for determining the AOR for a vehicle wheel 100 from a set of identified random local features 102 requires that the after the wheel coordinate system is established, an initial guess is made to identify the location x, y, z of each of the identified random local features 102 in the wheel coordinate system for the first wheel position.

Figure 11:
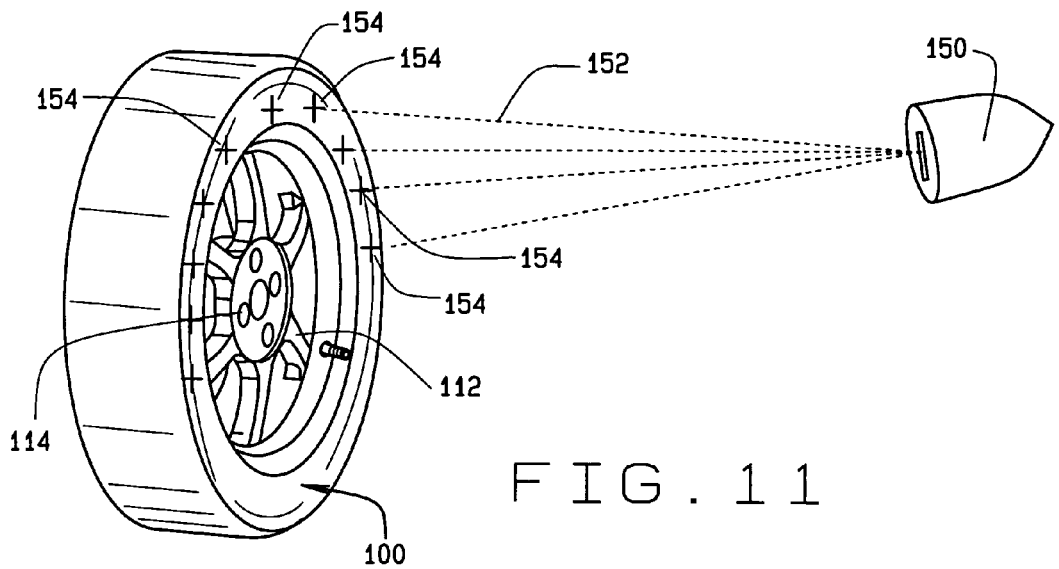
FIG. 11 is a perspective representation of a vehicle wheel onto which structured light patterns are projected.

In an optional embodiment of the present invention, shown in FIG. 11, a structured light projection means 150 is disposed to project structured light 152 having a predetermined pattern 154, such as dots, stripes, or crosses, onto the surface of the vehicle wheel 100. The projection means 150 may include any of a variety of controllable light sources, such as lasers, incandescent lights, fluorescent lights, LEDs, or the light capable of projecting a pattern onto a surface. The projected pattern effectively disposed an image of a known optical target onto the surface of the vehicle wheel 100, from which an initial distance estimation can be obtained. The sensor or imaging component 20 and the structured light projection system 150 are disposed such that the appearance of the projected structured light pattern in an image of the field of view FOV acquired by the sensor or imaging component 20 varies in relationship to the distance between the imaging component 20 and the surface of the wheel 100 onto which the structure light pattern is projected. By identifying random local features 102 in the initial image which are disposed in close proximity to, or within a limited region surrounding the projected structure light pattern on the wheel surface, an initial "guess" as to the coordinate locations (x, y, z) of each of the identified random local feature 102 can be made by assigning the identified random local features 102 the same distance measurements as are estimated for the proximal points in the structured light pattern. Once the initial coordinate location guess is established, the structured light projection system 150 is turned off, and the identified random local features 102 are tracked in sequential images from the sensor or imaging component 20 for subsequent wheel alignment calculations as previously described.

Next, an estimate of the Wheel Transform for first position [Tx, Ty, Tz, Rx, Ry, Rz] is calculated. Using a conventional optimization process, an initial estimate for the Wheel Transforms is determined for the remaining observed wheel positions.

There is a set of error terms for each observed vehicle wheel position which is the difference between the measured reference points in the image and the projected reference points (i.e., the reference points in target coordinates run through the Wheel Transform and Imaging Component Model). There is a set of error terms for each of the AOR vectors associated with each observed vehicle wheel position. Preferably, using conventional error minimization and optimization techniques, the reference points in target coordinates and the Wheel Transforms are adjusted until the error terms are minimized to within an acceptable tolerance.

Finding an initial guess for the Wheel Transform and reference points in wheel coordinates depends entirely on estimating the reference points in the Imaging Component Coordinate System. This requires distance information which can be estimated between the imaging component 20 and the associated vehicle wheel 100 in several ways.

For front wheels, the approximate position of the vehicle wheel 100 is known based on a measured relationship between the imaging components 20 of the imaging system 22 and a vehicle lift rack 42 or floor location upon which the vehicle is disposed. The approximate position of the imaging component 20 relative to a turn plate 46 on the lift rack 42 (or secured to the floor) is known.

For the rear vehicle wheels, it is known that the vehicle is disposed on the lift rail 44 of the lift rack 42, (or is approximately straight behind the front wheels if disposed on the floor), hence the location of the vehicle wheel 100 in the image may be correlated with the approximate distance from the imaging component 20.

An alternative method for approximating distance information is to identify one or more concentric ellipses defining a perimeter such as a wheel rim 160, tire rim 162, tire sidewall 164, stud nut pattern, stud holes 166, or a raised edge present about the circumference of a tire in the image from the imaging component 20, and to determine the diameter of the wheel rim, in pixels, verses either a nominal rim diameter (i.e., 15") or a rim diameter based on the vehicle-type selected by the alignment system, as observed at a known distance. The comparison provides an approximate estimate of the distance from the imaging component 20 to the imaged wheel rim. Alternatively, assuming that the wheel 100 rolls in a straight line without turning, the three-dimensional position of each of the concentric ellipses with respect to an innermost ellipse can be determined from two or more sequential images. The initial estimates of identified random local feature locations 102 can then be made relative to the nearest three-dimensional ellipse on the wheel 100.

In an alternate embodiment of the present invention, a range finding system 300 is provided in conjunction with the imaging components 20. The range finding system 300 preferably consists of a second imaging component 302 configured to provide an image of the wheel 100 along an axis of a second field of view which differs from the FOV of an associated imaging component 20 disposed to view the wheel 100. Preferably, the range finding system 300 is disposed in a predetermined relationship to each associated imaging component 20. However, those of ordinary skill in the art will recognize that the relationship is not required to be predetermined if the relationship is subsequently determinable either by measurement or observation. The image obtained along the axis of the second field of view is used by the processing system 14 in conjunction with the images obtained by the associated sensor or imaging component 20 to obtain an initial distance measurement to the vehicle wheel 100 from conventional stereoscopic image processing techniques. It will be recognized that the range finding system 300 may be disposed such that more than one vehicle wheel 100 is present within the second field of view. For example, range finding system 300 may be disposed with both the front and rear wheels 100 of one side a vehicle within the second field of view, enabling an estimate of distance to the front wheel to be obtained for an imaging component 20 disposed to view the front wheel, as well as a estimate of distance to the rear wheel to be obtained for an imaging component 20 disposed to view the rear wheel, provided the relationship between each imaging component 20 and the range finding system 300 is known or determinable.

Once the initial distance measurement is obtained with the range finding system 300, images from the second imaging component 302 are not required for subsequent calculations, and images of the wheel 100, including the identified random local features 102, are preferably obtained exclusively through the sensor imaging components 20. Those of ordinary skill in the art will recognize that images from the second imaging component 302 may optionally be utilized by the processing system 14 in subsequent calculations to obtain one or more additional estimates of distance as may be periodically required during a vehicle wheel alignment procedure.

Alternate range finding systems may include optical range finding systems, sonic range finding systems, or time-of-flight image sensors configured to acquire distance information for each pixel of an image. For range finding systems 300 employing an optical or imaging component 302, those of ordinary skill in the art will recognize that since the second imaging component 302 is utilized for the purposes of obtaining at least one estimate of a range or distance, and that the estimated range or distance is further refined by mathematical optimization techniques, it is not necessary for the second imaging component 302 to have an image resolution equivalent to that of the primary sensor or imaging component 20. Rather, the resolution of the second imaging component 302 need only be sufficient to enable identification of the wheel surfaces to which a distance measurement is required.

Once an estimate of the distance to the identified random local features 102 is obtained, it is possible to provide an initial guess using the following process: First, the reference points are undistorted in image coordinates u, v using an inverse imaging component model (notated as u', v'). Next, an estimate of the imaging component coordinate system coordinates i, j, k is calculated from the undistorted reference points using equations $i=u'k/FL$ and $j=v'k/FL$, where FL is the lens focal length for the imaging component 20. The k coordinate is estimated based on approximate distance to the center of the observed vehicle wheel 100 and where the reference point is in the image relative to the center of the vehicle wheel in the image.

Next, from the Imaging Component Coordinate System, the Wheel Coordinate System is established using conventional methods used to determine coordinates in a lift rack coordinate system. As previously described, a first reference point is selected to be the origin of the new coordinate system. A second reference point is selected to establish the X-axis. A third reference point is selected in the general direction of the Y-axis. Using a cross product between the X-axis vector and the approximate Y-axis vector determines the Z-axis. Using a second cross product between X-axis and the determined Z-axis identifies the actual Y-axis. Conventional methods, such as described in U.S. Pat. No. 6,064,750 to January et al., herein incorporated by reference, may be utilized to determine an Imaging Component-to-Wheel transform. The "Reverse" of this transform is the estimated Wheel Transform.

Finally, the reference points are found in the target coordinate system by transforming the reference points in imaging component coordinates to the wheel coordinate system using the Imaging Component-To-Wheel transform previously identified. The location of the reference points in the wheel coordinate system for the image of the vehicle wheel 100 in subsequent positions are the same as the locations found in the first vehicle wheel position. Conventional computations on changes in location of the identified reference points in the imaging component coordinate system from one wheel position to the next yield the AOR information for the vehicle wheel, from which vehicle wheel alignment angles can be subsequently determined.

A further alternate embodiment of the non-contact vehicle wheel alignment system of the present invention includes the use of range or distance information between the imaging components 20 and the observed vehicle wheel or optical target in the calculations of vehicle wheel alignment angles. Specifically, range or distance information (i.e., z-distance) is directly acquired for each pixel (i.e., x, y) in an image of a vehicle wheel 100 captured by an imaging component 20, without the need for a complex triangulation procedure. The range or distance information identifies the axial distance between the light sensing detectors in the imaging component 20 and a corresponding point in the observed field of view. Imaging components 20 configured to provide this type of range or distance information for each image pixel are manufactured by Canesta, Inc. of Palo Alto, Calif., and are set forth and described in U.S. Pat. No. 6,323,942 B1 to Bamji, herein incorporated by reference.

One of the essential parts of any imaging component based wheel alignment system 10 is compensating for distortion of the image due to the imaging component lens and other optical components that may be in place such as mirrors or prisms. The fundamental perspective equations (without distortion) are:

$$u=FL*X/Z$$

$$v=FL*Y/Z$$

where:
(u, v) is the coordinate of the object on the imaging component plane;
(X,Y,Z) is the coordinate of the object in 3D space relative to the imaging component; and
FL represents the focal length.

Preferably, an imaging component 20, configured to provide range or distance information, provides as an output (u, v) and Z for any object in an image. Directly providing the Z value for each pixel in an image greatly reduces the complexity of the necessary equations and subsequently all the derivatives of these equations that account for image distortion. The net effect is a much improved method for determining the lens distortion, and ultimately to improved measurements of an optical target or vehicle wheel.

Preferably, in the processing of the lens distortion equations, as well as the processing of the optical targets (after the lens distortion has been determined), non-linear optimization techniques are used. As described above, these require an initial guess to identify the location x, y, z of each local feature to seed the optimization. Providing range information directly from the imaging component 20 greatly improves the initial guess used to seed the optimization and thus improves the end result.

For example, when using conventional planar optical targets, the optimization could be further constrained by using the range information directly received from the imaging component 20 to assure that the identified reference points measured using the imaging component 20 are, in-fact, planar. Non-planar reference points would indicate a possible source of error. For example, range information can be utilized as an aid in identifying bent or damaged planar optical targets. Under a test condition, the desired range to each reference point on the target surface is known, and the wheel alignment system is configured to implement checks to determine whether the target is, in-fact, planar. If the optical target is not planar, a warning can be displayed to the user to indicate a new optical target may be required.

Figure 12:
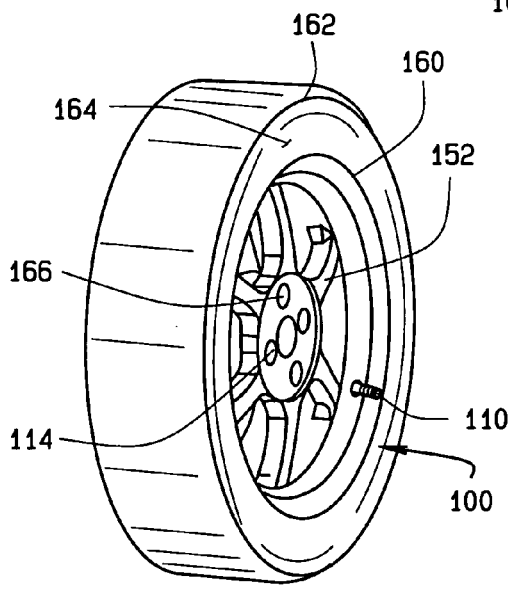
FIG. 12 is a perspective representation of a vehicle wheel incorporating identifiable three-dimensional features.

To determine vehicle wheel position from a three-dimensional image (i.e., an image having x, y, and z information for each pixel), the same sort of random local features 102 can be used as are described, provided they have an identifiable three-dimensional position, from which an identifiable reference point can be determined. For example, as shown on FIG. 12, instead of visual features such as color markings or mud-spatters, unique and identifiable three-dimensional shapes such as vehicle wheel valve stems 110, wheel rim spokes 112, tire tread lugs (not shown), and lug nuts 114 can be used as random local features from which identifiable reference points can be calculated. The identifiable reference points need not correspond directly with the observed local features, and may be merely identified by a positional relationship to an observed local feature.

Figure 13:
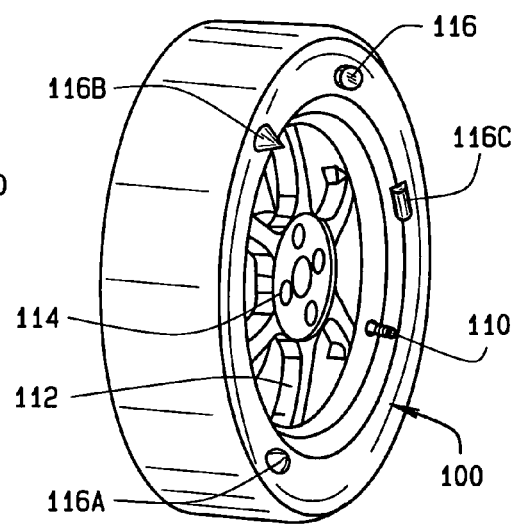
FIG. 13 is a perspective representation of the wheel of FIG. 12, on which removable three-dimensional features are removably secured.

Alternatively, as shown in FIG. 13, disposable, adhesive three-dimensional elements or bumps 116 may be removably secured to the to the sidewall of the vehicle wheel 100, similar to chair casters. The adhesive bumps 116 are preferably composed of a bright, reflective material, facilitating identification in an image. To improve accuracy, the adhesive bumps 116 could have a hemispherical shape, such as shown at 116A, whose center can be calculated from multiple surface points. Adhesive bumps 116 may optionally consist of shapes other than hemispherical (116A). For example, conical adhesive targets 116B or hemi-cylindrical adhesive targets 116C can also be located accurately by matching three-dimensional points to a single equation.

Alternatively, faceted targets mounted to the vehicle wheel 100 can have their position accurately determined from multiple reference points. The predetermined model for a faceted target may consist of a group of planes and the relationships between the planes. These shapes can also be adapted to normal two-dimensional vision systems for accurate location as described in the next section.

The ability for an imaging system 22 to acquire range and distance information permits the incorporation of optional features into an optical vehicle wheel alignment system 10. For example, imaging components 20 configured to acquire range and distance information may be utilized as inspection devices to identify deformities in the vehicle wheels 100 such as bent rims or tire bubbles. The same sensor may optionally examine the amount of bulge in the base of a tire to determine if the tire is badly under inflated, signaling the vehicle wheel alignment system 10 to prompt the user to check the air pressure of the tire.

With each embodiment of the present invention wherein an imaging system 22 is configured to observe a vehicle wheel 100 without the attachment of a predetermined optical target 24 there to, i.e., wherein an imaging system 22 is configured to directly identify reference points on the vehicle wheel from random local features, or from three-dimensional features of the vehicle wheel, it is preferred that the imaging system 22 be configured to determine if sufficient points of interest (i.e. random local features or three-dimensional points) are present in an image before calculating vehicle wheel alignment angles. If sufficient points of interest are found, nothing additional needs to be applied. However, if the imaging system 22 initially determines that there are not sufficient points of interest (or subsequently, such as after the vehicle wheel is rolled from a first position to a second position), the imaging system 22 provides a signal to the vehicle wheel alignment system to alert the user that one or more observable features, such as targets, must be removably secured to the vehicle wheels. These observable features may be predetermined optical targets, or discrete target elements such as adhesive bumps 116, identifiable stickers, or other markings.

In order to provide for unobstructed viewing of vehicle wheels and/or any optical targets 24 mounted there on, the imaging components 20 of the imaging system 22 may be disposed in a variety of positions about a vehicle undergoing inspection or alignment. For example, the optical imaging vehicle wheel alignment system 10 may be configured to provide at least one imaging component 20 for each vehicle wheel. Each imaging component 20 is preferably positioned such that an outer surface of an associated wheel is present in a field of view (FOV) of the imaging component 20. Each imaging component 20 is optimally positioned such that an outer edge of the wheel is present in the FOV of the imaging component 20 while the vehicle is on a lift rack 44, while the wheel is steered to the left or right, or while the vehicle is elevated to permit the vehicle suspension components to hang suspended above the lift rack rails 42 or shop floor.

Figure 14:
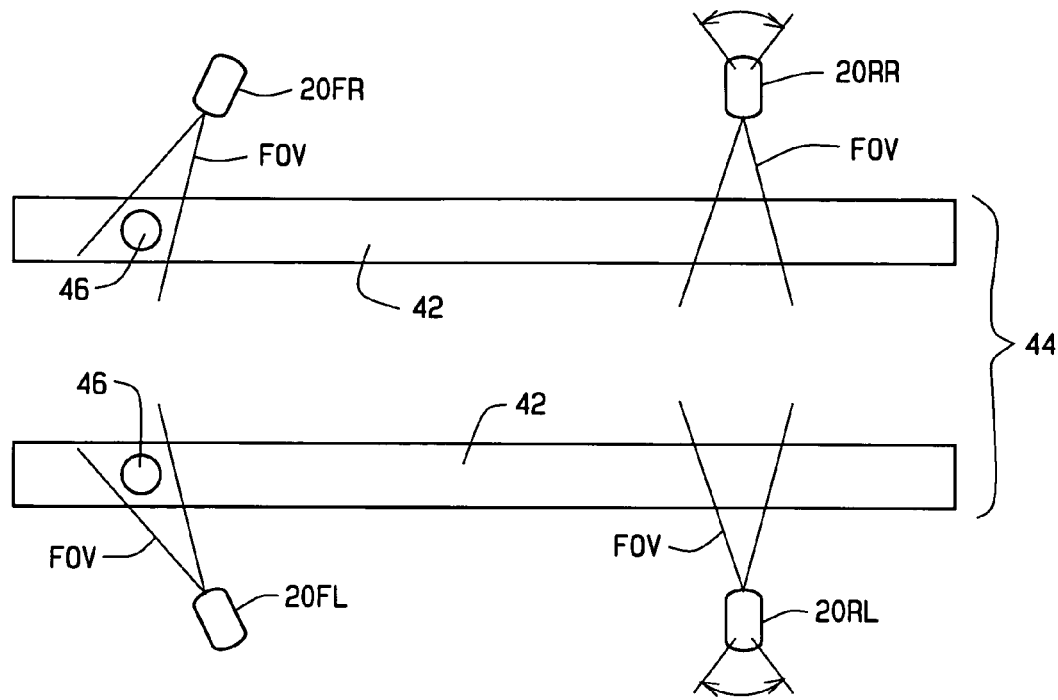
FIG. 14 is a simplified representation of the placement of imaging components at fixed positions adjacent a vehicle lift rack.

Turning to FIG. 14, an exemplary placement for four imaging components 20FL, 20RL, 20FR, and 20RR of an imaging system 22, corresponding to each vehicle wheel 100, is shown. Preferably, each of the imaging components 20 is located at ground level, to look up at each of the associated vehicle wheels 100 of the vehicle, so that the FOV for each imaging component 20 is not blocked by the presence of vehicle body components. The configuration shown in FIG. 14 works best with no lift rack 44 or with the lift rails 42 of a lift rack 44 at a low position so the treads of the vehicle tires do not obstruct a clear FOV of the wheel surfaces. Preferably, in the embodiment shown in FIG. 14, each imaging component 20 is displaced laterally from the lift rails 42 of the lift rack 44, with the front two imaging components 20F slightly rearward of the associated front wheel locations on turnplates 46, to increase their viewing angle with respect to the wheel. Placement of the front two imaging components 20FR and 20FL slightly rearward of each turnplate 46 facilitates detection of wheel angles, due to the fact that the most important wheel position and orientation data is normal to the outer surface of the wheel.

The two rear imaging components 20RR and 20RL are disposed adjacent the location of the rear wheels 100 for a vehicle with an average wheelbase. Preferably, as shown in FIG. 14, the two rear imaging components 20RR, 20RL are provided with rotating turret mechanisms to permit the imaging components 20RR, 20RL to rotate in the floor plane and to accommodate vehicles of different wheelbases, while maintaining the rear vehicle wheels in a tight field of view.

Placing the two rear imaging components 20RR and 20RL in rotating turret mechanisms provides several advantages. The rotating turret mechanisms may be constructed with a small size, which keeps the rear imaging components 20RL and 20RR from occupying excessive space in a service bay. The rear imaging components 20RL and 20RR can be placed immediately adjacent the lift rack 44 within normal service bay spacing. Finally, being small and low to the ground, the rear imaging components 20RR and 20RL and associated rotating turret mechanisms may be rigidly mounted to the floor to avoid misalignment or damage by being enclosed within a protective cage. The protective cage can be integrated with a console, a storage unit, or other bay equipment.

Those of ordinary skill in the art will recognize that the placement of the imaging components 20 need not be limited to the configuration shown in FIG. 14, and that a wide variety of configurations are suitable, provided that the imaging components 20 are capable of obtaining images of the required vehicle wheels and any associated targets having sufficient resolution for image processing.

Independent of the specific configuration and placement of the imaging components 20 of the imaging system 22, it is necessary to identify the positional relationships between each of the imaging components 20 and the vehicle lift rack 44 or vehicle position. Knowing the imaging component positional information allows measurements to be transformed to a common coordinate system where alignment angles can be determined.

If the imaging components 20 are disposed apart from the vehicle lift rack 44, it is preferred that they be in a fixed location. Provided the imaging components 20 are in a fixed location, the actual location relative of the imaging components 20 to the vehicle lift rack 44 and relative to each other can be established using a field calibration procedure substantially similar to that utilized by conventional non-contact optical vehicle wheel alignment systems, such as shown in U.S. Pat. No. 5,724,128 to January.

If the imaging components 20 are disposed on the vehicle lift rack 44, or coupled to the vehicle lift rack 44, it is preferable to provide a means for dynamically locating each imaging component 20 relative to another. Optionally, each imaging component 20 may be dynamically located relative to adjacent imaging components 20 using conventional displacement sensor technology, such as described in U.S. Pat. No. 5,488,472 to January, or alternatively, each imaging component 20 may be configured to observe a optical target disposed on an adjacent imaging component 20, to acquire the necessary information.

Figure 15:
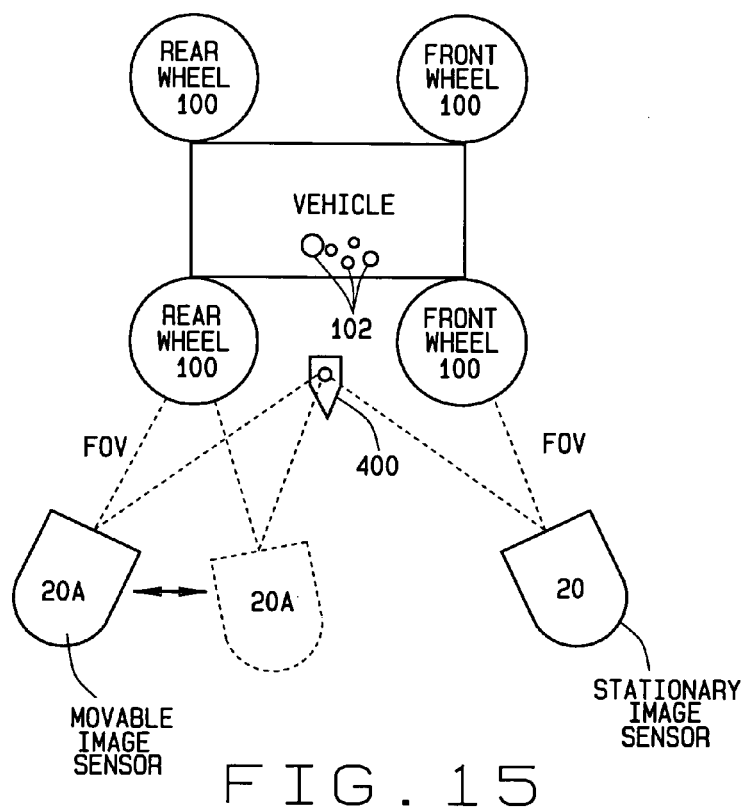
FIG. 15 is a simplified diagram illustrating the relationships between image sensors and a fixed optical target on one side of a vehicle in an alternate embodiment of the present invention.

An alternate embodiment of the present invention, such as shown at FIG. 15, an optical imaging vehicle wheel alignment system 10 includes one or more movable imaging components 20A configured to alter either position or rotate to change an associated field of view to accommodate vehicles having different wheelbase dimensions, and one or more stationary optical targets 400. At least one stationary optical target 400 is viewable within a field of view (FOV) by a movable imaging component 20A from a known initial position and at a subsequent position (shown in phantom), after a movement or rotation. A stationary optical target 400 may consist of a single optical target element, or of two or more optical target elements having a fixed and predetermined relationship, such that at least one optical target element is visible to the adjustable imaging component 20A at any point within a field of view defined by the range of movement or range of rotation. Preferably, each stationary optical target 400 has a known or determinable relationship to any fixed imaging components 20 in the vehicle wheel alignment system 10.

Images of the stationary optical target 400 are processed by the wheel alignment system computer 14 before and after movement of the adjustable imaging components 20A to determine a change in the position and/or orientation of the adjustable imaging component 20A in three dimensional space from the known initial position. With at least one imaging component 20 in a fixed location, the movement of an adjustable imaging components 20A can be established from initial images, using a field calibration procedure substantially similar to that utilized by conventional non-contact optical vehicle wheel alignment systems, such as shown in U.S. Pat. No. 5,724,128 to January. A common coordinate system is established between the stationary imaging component 20 and the adjustable imaging component 20A in the initial known position. The relationship between the adjustable imaging component 20A in the initial known position and the stationary target 400 is additionally determined. Following movement of the adjustable imaging component 20A, a second relationship between the adjustable imaging component 20A and the stationary target 400 is determined. From the first and second determined relationships, the amount of movement of the adjustable imaging component 20A is identified, and a transform between the current coordinate system of the adjustable imaging component 20A and coordinate system of the adjustable imaging component 20A in the initial known position is determined.

Coordinates of features identified in the field of view of the adjustable imaging component 20A are transformed to the corresponding coordinates in the coordinate system of the adjustable imaging component 20A at the initial known position, which has a previously determined relationship to the coordinate system of the fixed imaging component 20, enabling all feature coordinates to be transformed into a single common coordinate system following movement of the adjustable imaging component 20A.

In an alternate embodiment, one or more identified random features 102 present on the chassis of a vehicle or lift rack system in the field of view of the imaging components 20 and 20A are utilized in place of stationary optical target 400 to enable tracking of movement of the adjustable imaging component 20A. An initial coordinate system is established using a set of the identified random local features 102 in a similar fashion to the methods previously described in conjunction with identified random local features 102 on a vehicle wheel rim and tire assembly. A transform is determined from the local feature coordinate system to a coordinate system of the adjustable imaging component 20A. After the adjustable imaging component 20A is moved, the same set of random local features 102 is identified in a subsequent image from the adjustable imaging component 20A, and a new transform is determined between the local feature coordinate system and the new location of the adjustable imaging component 20A, enabling the movement of the adjustable imaging component 20A to be determined, and enabling a transform to be determined between the current coordinates system of the adjustable imaging component 20A, the initial coordinate system of the adjustable imaging component 20A, and a coordinate system of at least one fixed imaging component 20.

Figure 16:
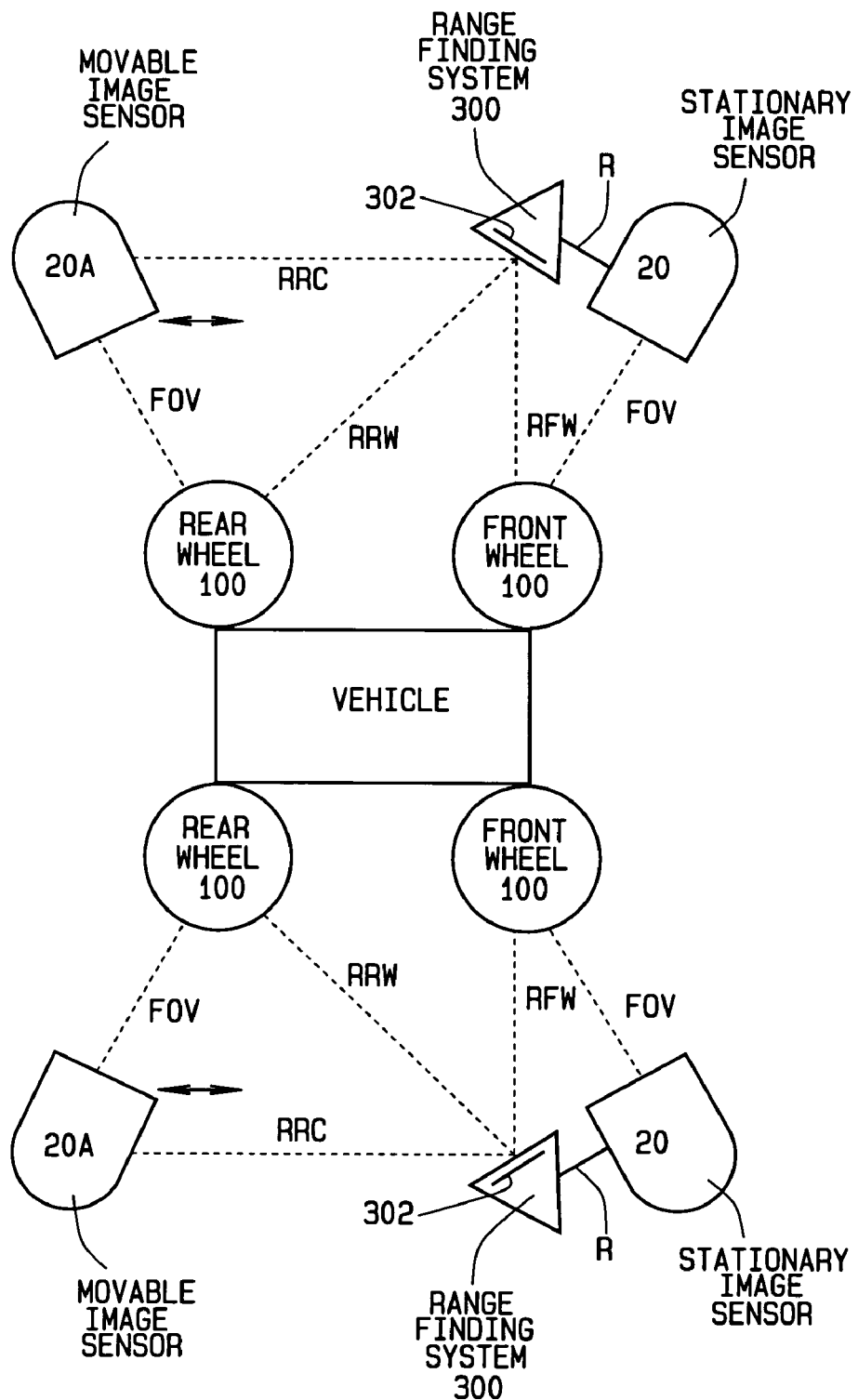
FIG. 16 is a simplified diagram illustrating the relationships between image sensors and range finding systems on both sides of a vehicle in an alternate embodiment of the present invention.

In an alternate embodiment of the optical imaging vehicle wheel alignment system 10 of the present invention shown in FIG. 16, the range finding system 300 on one side of a vehicle is adapted to provide information associated with the positioning of an adjustable imaging component 20A on the same side of the vehicle. The range finding system 300 is disposed in a fixed location having a field of view which encompasses a vehicle wheel 100 and the adjustable imaging component 20A disposed to acquire images of the vehicle wheel 100 within a field of view (FOV). The range finding system 300 is initially utilized to determine the current position of the adjustable imaging component 20A from one or more measurements between the range finding system 300 and the adjustable imaging component 20A, shown as RRC in FIG. 16. Subsequently, the range finding system 300 is utilized in combination with the adjustable imaging component 20A to determine an initial estimate of distance between the adjustable imaging component 20A and the associated vehicle wheel 100, as previously described, either by providing a initial measurement of the distance using triangulation techniques, or by providing a second image from which a stereoscopic processing technique may be utilized to determine the distance.

The relationship between the range finding system 300 and the adjustable imaging component 20A is preferably determined by acquiring measurements of a plurality of local features visible on the exterior surface of the adjustable imaging component 20A. Images and measurements of the local features on the exterior of the adjustable imaging component 20A are utilized to establish an imaging body coordinate system, in the same manner as images and measurements of local features on a wheel surface are utilized to establish the position and orientation of a wheel. Alternatively, if the configuration of the adjustable imaging component 20A is predetermined, position and orientation information associated with the adjustable imaging component 20A can be determined from images of the known features of the adjustable imaging component 20A, such as a housing shape and dimensions, using conventional machine vision algorithms.

Images of the wheel 100 from the adjustable imaging component 20A are processed by the wheel alignment system computer 14, together with measurements obtained by the range finding system 300 before and after movement of the adjustable imaging components 20A to determine a change in the position and/or orientation of the adjustable imaging component 20A in three dimensional space from the known initial position. With at least one imaging component 20 in a fixed location having a known relationship R to the range finding system 300, the movement of an adjustable imaging component 20A can be established from initial images and measurements, using a field calibration procedure substantially similar to that utilized by conventional non-contact optical vehicle wheel alignment systems, such as shown in U.S. Pat. No. 5,724,128 to January.

A common coordinate system is established between the stationary imaging component 20 and the adjustable imaging component 20A in the initial known position. Following movement of the adjustable imaging component 20A, a second measurement between the adjustable imaging component 20A and the range finding system 300 is determined. From the first and second determined measurements, the amount of movement of the adjustable imaging component 20A is identified, and a transform between the current coordinate system of the adjustable imaging component 20A and coordinate system of the adjustable imaging component 20A in the initial known position is determined.

Coordinates of features identified in the field of view of the adjustable imaging component 20A are transformed to the corresponding coordinates in the coordinate system of the adjustable imaging component 20A at the initial known position, which has a previously determined relationship to the coordinate system of the fixed imaging component 20, enabling all feature coordinates to be transformed into a single common coordinate system following movement of the adjustable imaging component 20A.

In addition to providing a determination of a relationship (RRC) between the range finding system 300 and the adjustable imaging component 20A, the range finding system 300 may be utilized to provide a distance measurement (RFW) to the front wheel 100 of the vehicle, and a distance measurement (RRW) to the rear wheel 100 of the vehicle for use in establishing initial estimates of distances between each imaging component and the associated vehicle wheels within the fields of view (FOV), as previously described.

Figure 17:
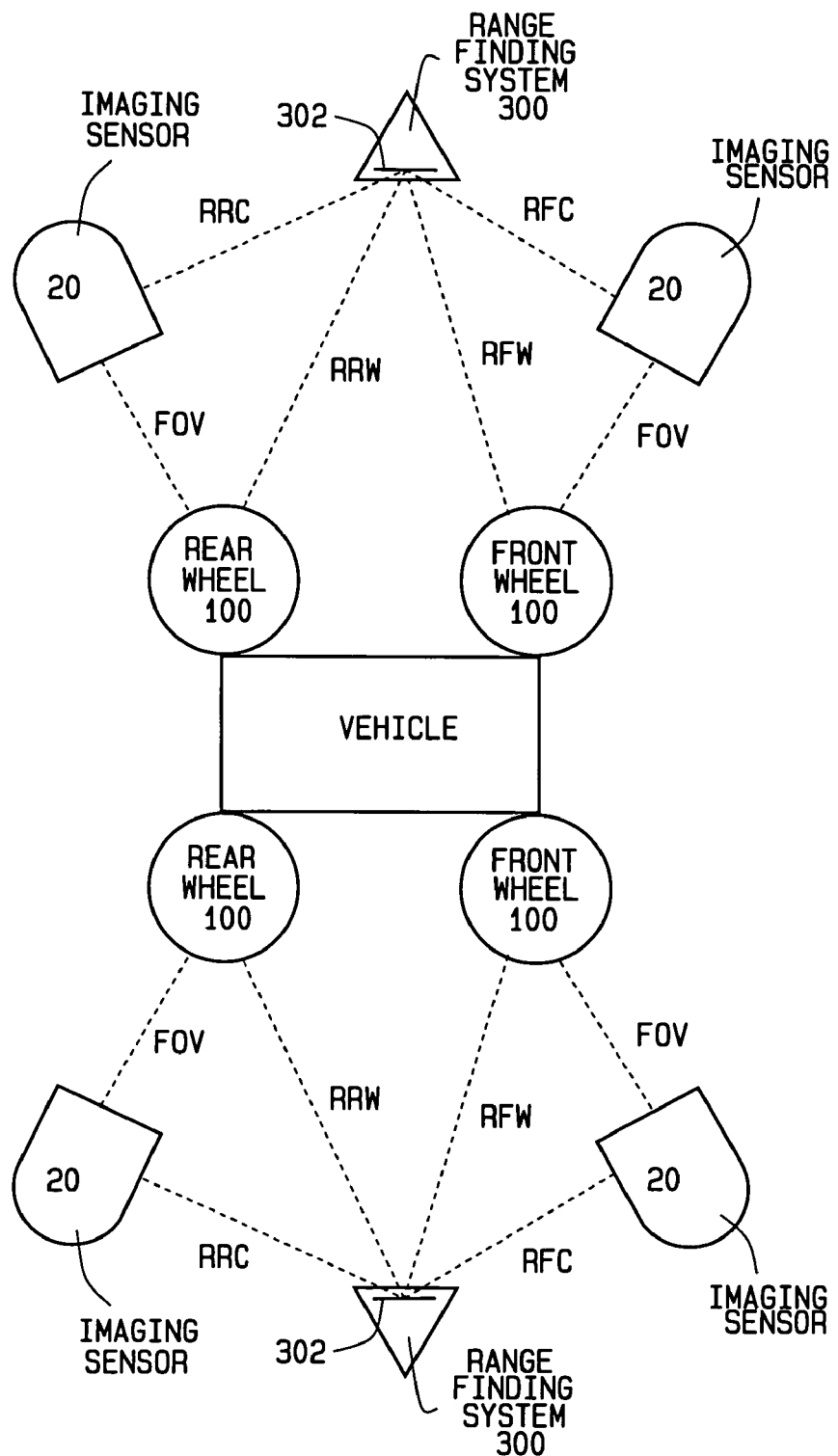
FIG. 17 is a simplified diagram illustrating and alternate set of relationships between image sensors and range finding systems on both sides of a vehicle in an alternate embodiment of the present invention.

Turning to FIG. 17, a variation of the embodiment of the present invention shown at FIG. 16 is illustrated. Specifically, the relationship between the range finding system 300 and the fixed or stationary imaging component 20 is no longer known or predetermined. Rather, the range finding system 300 is further configured to determine an additional relationship (RFC) with the stationary imaging sensor 20 in the same manner as described above for the adjustable imaging sensor 20A. The relationship measurements (RFC) to the stationary imaging sensor 20 are utilized by the vehicle wheel alignment system computer 14 in place of the known or predetermined relationship R shown in FIG. 15 to establish a common coordinate system between the various imaging components 20 on at least one side of the vehicle.

Those of ordinary skill in the art will recognize that the identification of random local features present in images acquired by the imaging system 22 is not limited to use in determining vehicle wheel alignment angles or imaging component movement. For example, by identifying random local features on a vehicle body or chassis, or temporarily applied thereto, movement of a vehicle during a vehicle wheel alignment or service procedure can be identified from changes in the positions of the identified random local features in sequential images. Identified vehicle movement can provide useful vehicle translational movement information during a vehicle wheel alignment procedure wherein the vehicle wheels are rolled on a surface to determine an axis of rotation (AOR) for the vehicle wheels. Alternatively, it will be recognized that if the vehicle body or chassis remains stationary during movement of the imaging component, changes in the position of the identified random local features in subsequent images may be utilized to provide a measure of movement of the imaging component.

In some vehicle wheel alignment applications, it is useful to identify a reference surface on which the vehicle wheels are resting, i.e. the surface of a vehicle lift system or runway system. It is known to provide predetermined optical targets in a fixed relationship to the vehicle lift system runways, as is shown in U.S. Pat. No. 5,676,515 to January, which is herein incorporated by reference. In an alternate embodiment of the present invention, optical targets 24 are disposed in a fixed relationship to a surface on which a vehicle is disposed during a vehicle wheel alignment procedure, and images of the optical targets 24 are acquired, together with images of random local features on the vehicle wheel rim and tire assemblies. The images of the random local features are utilized to identify wheel alignment angle parameters, and the images of the optical targets are utilized to establish a reference plane on which the vehicle wheels are disposed, or to facilitate tracking movement of the adjustable imaging components 20A, as previously described. The optical targets 24 may be predetermined optical targets, as disclosed in the U.S. Pat. No. 5,676,515 to January, or may be one or more local features disposed on the surface on which the vehicle is disposed, and which are identifiable in an image.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or other computer readable storage medium, wherein, when the computer program code is loaded into and executed by a computer, the computer becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle wheel alignment system for determining the alignment of at least one wheel of a vehicle, said system comprising:

an imaging means having a first field of view encompassing at least a portion of said at least one wheel, said imaging means configured to obtain at least one optical image of said first field of view;

a range finding means disposed in a predetermined relationship external to said at least one imaging means, said range finding means having a second field of view partially intersecting said first field of view and encompassing at least a portion of said at least one wheel, said range finding means configured to obtain data representative of a distance between said range finding means and at least one point on said at least one wheel within said second field of view;

a processing system operatively connected to said at least one imaging means and said range finding means, wherein said processing system is configured to process said at least one optical image to identify a plurality of random local features disposed on a surface of said at least one vehicle wheel; and wherein said processing system configured to utilize said identified random local features, said obtained distance data, and said predetermined relationship between said range finding means and said at least one imaging means, to determine one or more wheel alignment measurements.

2. The vehicle wheel alignment system of claim 1 wherein said processing system is configured to utilize said obtained distance data to provide an initial starting point for a three-dimensional position estimation for said plurality of identified random local features.

3. The vehicle wheel alignment system of claim 2 wherein said processing system is further configured to optimize said three-dimensional position estimation for said plurality of identified random local features utilizing at least one subsequent image obtained from said imaging means.

4. The vehicle wheel alignment system of claim 1 wherein said range finding means includes at least one optical time-of-flight sensor disposed to receive at least one image of said second field of view, said optical time-of-flight sensor configured to obtain said data representative of a distance between said optical time-of-flight sensor and at least one point on said at least one wheel in said second field of view.

5. The vehicle wheel alignment system of claim 1 wherein said range finding means includes an imaging component configured to generate at least one image of said at least one wheel within said second field of view; and wherein said range finding means is cooperative with said imaging means to obtain data representative of a distance between said range finding means and at least one point on said at least one wheel.

6. The vehicle wheel alignment system of claim 5 wherein said imaging component included in said range finding means has a lower image resolution than said imaging means.

7. The vehicle wheel alignment system of claim 5 wherein said processing system is further configured to utilize said at least one image of said at least one wheel within said second field of view from said imaging component only to obtain data representative of a distance between said range finding means and at least one point on said at least one wheel.

8. The vehicle wheel alignment system of claim 1 wherein said range finding means is an ultrasonic range finding system.

9. A method for determining the alignment of a vehicle, comprising:
disposing at least one sensor in proximity to the vehicle such that at least one wheel of the vehicle is disposed within the field of view of said at least one sensor;
associating a range finding system in a known relationship with said at least one sensor, said associated range finding system disposed to measure a distance to at least one point on an object within the field of view of said associated sensor;
utilizing said sensor to obtain at least one image of said vehicle wheel in a initial position and at an initial orientation;
processing said images to identify a plurality of local features disposed on a surface of said vehicle wheel;
utilizing said range finding system to obtain at least one distance measurement associated with at least one of said identified local features;
processing said images, together with said obtained distance measurements and known relationship between said at least one sensor and said associated range finding system, to establish an initial estimated position and an initial estimated orientation of said vehicle wheel;
moving said vehicle wheel;
obtaining at least one subsequent image associated with said vehicle wheel;
processing each of said at least one subsequent images to identify said plurality of local features disposed on said vehicle wheel; and
utilizing said plurality of identified local features in each subsequent image, together with said estimated initial position and estimated initial orientation, to determine one or more vehicle wheel alignment angles.

10. The method of claim 9 for determining the alignment of a vehicle, further including the step of calculating a set of identified reference points said vehicle wheel from said plurality of identified local features and said obtained distance measurements.

11. The method of claim 9 for determining the alignment of a vehicle wherein the step of utilizing includes determining positional changes of said identified local features between subsequent images to determine one or more vehicle wheel alignment angles.

12. The method of claim 11 for determining the alignment of a vehicle wherein the step of utilizing further includes determining an axis of rotation for said vehicle wheel from said determined positional changes.

13. The method of claim 11 for determining the alignment of a vehicle further including the step of establishing a three-dimensional coordinate system for said vehicle wheel from said first image, said obtained distance measurements, and from a selected subset of said plurality of local features, such that each of said plurality of local features has a fixed position within said established three-dimensional coordinate system.

14. The method of claim 13 for determining the alignment of a vehicle further including the step of calculating at least one transformations between said established coordinate system and an associated imaging system coordinate system to determine positional changes in said associated imaging system coordinate system of said identified local features between subsequent images.

* * * * *